(12) United States Patent
Al-Qahtani

(10) Patent No.: US 11,801,472 B2
(45) Date of Patent: Oct. 31, 2023

(54) AMINE SWEETENING IN FLASH GAS

(71) Applicant: Saudi Arabian Oil Company, Dhahran (SA)

(72) Inventor: Nasser A. Al-Qahtani, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 526 days.

(21) Appl. No.: 16/259,322

(22) Filed: Jan. 28, 2019

(65) Prior Publication Data

US 2020/0238212 A1 Jul. 30, 2020

(51) Int. Cl.
*B01D 53/14* (2006.01)
*B01D 3/06* (2006.01)

(52) U.S. Cl.
CPC ............ *B01D 53/1462* (2013.01); *B01D 3/06* (2013.01); *B01D 2252/204* (2013.01); *B01D 2256/245* (2013.01); *B01D 2257/304* (2013.01); *B01D 2257/504* (2013.01)

(58) Field of Classification Search
None
See application file for complete search history.

(56) References Cited

U.S. PATENT DOCUMENTS

| | | |
|---|---|---|
| 4,397,660 A | 8/1983 | Van Der Pastoornstra |
| 4,772,298 A | 9/1988 | Stewart |
| 2006/0196357 A1 | 9/2006 | Menzel |
| 2007/0028772 A1 | 2/2007 | Jain et al. |
| 2012/0076716 A1* | 3/2012 | Suchak ............... C01B 32/50 423/437.1 |
| 2013/0015406 A1 | 1/2013 | Gazarian et al. |

FOREIGN PATENT DOCUMENTS

EP 3061516 8/2016

OTHER PUBLICATIONS

Bishnoi and Rochelle, "Absorption of carbon dioxide aqueaous piperanzine/methyldiethanolamine," AIChE Journal, vol. 48, No. 12, Dec. 2002, 12 pages.
Bullin and Brown, "Hydrocarbons and Btex Pickup and Control from Amine Systems," presented at the 83rd Annual GPA Convention, Mar. 15, 2004, 17 pages.
Elbel and Hrnjak, "Flash gas bypass for improving the performance of transcritical R744 systems that US microchannel evaporators," Int. J. Refrig. vol. 27, No. 7, Nov. 2004, 12 pages.

(Continued)

*Primary Examiner* — Daniel Berns
(74) *Attorney, Agent, or Firm* — Fish & Richardson P.C.

(57) ABSTRACT

Certain implementations of amine sweetening of flash gas are described. Flash gas including acid gas is flowed from a flash drum through a column section connected to the flash drum. A lean amine stream is flowed through the column section. The lean amine stream is configured to treat the acid gas flowed from the flash drum through the column section. A quantity of the lean amine stream flowed through the column section is controlled based, in part, on a rate at which the flash gas including the acid gas is flowed from the flash drum through the column section and a concentration of the acid gas in the flash gas.

14 Claims, 1 Drawing Sheet

(56) References Cited

OTHER PUBLICATIONS

Kohl and Nielsen, "Gas purification," 5th Edition, Gulf Publishing, 1997, 1414 pages.
Krish et al., "Optimize amine process design using liquid-phase turbochargers," PlantDesign, Dec. 2015, 8 pages.
Schneider et al., "Recovery of flash gas from storage tanks at an offshore production platform using scroll compression technology," SPE International Conference on Health, Safety and Environment in Oil and Gas Exploration and Production, Apr. 12-14, 2010, 6 pages.
Slagle, "Improve your gas plant's performance in the middle east," GPA GCC 21st Annual Technical Conference, May 2013, 18 pages.
Weiland and Dingman, "Column design using mass transfer rate simulation Optimized Gas Treating Inc.," presented at the 80th Annual Gas Processors Association Convention, Mar. 21, 2001, 13 pages.
Zurlo et al., "Solubility of hydrocarbons and light ends in amines," Optimized Gas Treating, AFPM Annual Meeting, Mar. 23-25, 2014, 12 pages.
International Search Report and Written Opinion issued in International Application No. PCT/US2020/015328 dated Jun. 4, 2020, 14 pages.

\* cited by examiner

AMINE SWEETENING IN FLASH GAS

TECHNICAL FIELD

This disclosure relates to processing hydrocarbons, for example, natural gas.

BACKGROUND

Gaseous hydrocarbons, for example, natural gas, produced from subsurface reservoirs can be sour meaning that the gas includes significant amounts of hydrogen sulfide ($H_2S$). For example, in some regions, natural gas is considered sour if it contains about 4 parts per million (ppm) by volume of $H_2S$ under standard temperature and pressure. Alternatively or in addition, gaseous hydrocarbons can be acidic meaning that the gas includes significant amounts of carbon dioxide ($CO_2$). $H_2S$ and $CO_2$ are toxic and corrosive, and therefore are undesirable components in natural gas. The process of removing or reducing the concentration of these gases in natural gas is called sweetening. Gas processed to remove or reduce the concentration of these gases is called sweet gas. Several techniques can be implemented to sweeten natural gas. One such technique is amine treatment by which the gases can be separated from the natural gas.

SUMMARY

This specification describes technologies relating to amine sweetening in flash gas.

The present disclosure includes one or more of the following units of measure with their corresponding abbreviations, as shown in Table 1:

| Unit of Measure | Abbreviation |
|---|---|
| Degrees Fahrenheit | ° F. |
| Parts per million | ppm |
| Pounds per square inch (pressure) | Psi |
| Pounds per square inch gauge (pressure) | Psig |
| One million | MM |
| Standard cubic feet per day | SCFD |
| gallons per minute | gpm (U.S. measure) |
| Mole | mol |

Certain implementations of the subject matter described here can be implemented as a method of treating natural gas. Flash gas including acid gas is flowed from a flash drum through a column section connected to the flash drum. A lean amine stream is flowed through the column section. The lean amine stream is configured to treat the acid gas flowed from the flash drum through the column section. A quantity of the lean amine stream flowed through the column section is controlled based, in part, on a rate at which the flash gas including the acid gas is flowed from the flash drum through the column section and a concentration of the acid gas in the flash gas.

Some aspects combinable with any of the other aspects described in this disclosure can include the following features. To control the quantity of the lean amine stream, an initial quantity of the lean amine stream is determined. Periodic measurements of the rate at which the flash gas including the acid gas is flowed and the concentration of the acid gas are received. The initial quantity is periodically updated to determine a revised quantity of the lean amine stream based on the periodic measurements.

Some aspects combinable with any of the other aspects described in this disclosure can include the following features. To control the quantity of the lean amine stream, a flow rate of the lean amine amine stream through the column section is periodically varied according to the revised quantity of the lean amine stream.

Some aspects combinable with any of the other aspects described in this disclosure can include the following features. The flow rate is varied between 0.05 MMSCFD and 2.0 MMSCFD.

Some aspects combinable with any of the other aspects described in this disclosure can include the following features. The initial quantity is updated according to the following equation:

$$\text{Set point of lean amine} = \frac{\text{Flash gas rate} \times \text{Acid gas concentration} \times \text{Amine mole factor}}{\text{Lean amine acid loading} \times \text{Lean amine concentration}}$$

Set point of lean amine is the flow rate of the lean amine stream, Flash gas rate is the rate at which the flash gas comprising the acid gas is flowed, Amine mole factor is a constant selected based on a type of the lean amine stream, Lean amine acid loading is an amount of acid gas separated by the lean amine stream, and Lean amine concentration is an amount of amine in the lean amine stream.

Some aspects combinable with any of the other aspects described in this disclosure can include the following features. Treated flash gas exiting the column section is flowed through a filtering column configured to filter benzene, toluene and xylenes (BTX) and particulates in the treated flash gas.

Some aspects combinable with any of the other aspects described in this disclosure can include the following features. To flow the treated flash gas through the filtering column, the treated flash gas is flowed through activated charcoal and a mechanical filter in the filtering column.

Certain implementations of the subject matter described here can be implemented as a method of treating natural gas. Flash gas including residual acid gas is flowed from a flash drum through a column section connected to the flash drum. In the column section, the flash gas is contacted with a lean amine stream configured to treat the residual acid gas. The lean amine stream is flowed through the column section at a flow rate. The flow rate of the lean amine stream is periodically varied based, in part, on a rate at which the flash gas is flowed from the flash drum through the column section and a concentration of the residual acid gas in the flash gas.

Some aspects combinable with any of the other aspects described in this disclosure can include the following features. The rate at which the flash gas is flowed from the flash drum through the column section is periodically received. The concentration of the residual acid in the flash gas is periodically received.

Some aspects combinable with any of the other aspects described in this disclosure can include the following features. The rate at which the flash gas is flowed from the flash drum through the column section is periodically measured. The concentration of the residual acid in the flash gas is periodically measured.

Some aspects combinable with any of the other aspects described in this disclosure can include the following features. The flow rate of the lean amine stream is varied in real-time.

Some aspects combinable with any of the other aspects described in this disclosure can include the following features. The flow rate of the lean amine stream is periodically varied according to the following equation:

$$\text{Set point of lean amine} = \frac{\text{Flash gas rate} \times \text{Acid gas concentration} \times \text{Amine mole factor}}{\text{Lean amine acid loading} \times \text{Lean amine concentration}}$$

Set point of lean amine is the flow rate of the lean amine stream, Flash gas rate is the rate at which the flash gas comprising the acid gas is flowed, Amine mole factor is a constant selected based on a type of the lean amine stream, Lean amine acid loading is an amount of acid gas separated by the lean amine stream, and Lean amine concentration is an amount of amine in the lean amine stream.

Some aspects combinable with any of the other aspects described in this disclosure can include the following features. Treated flash gas exiting the column section through a filtering column configured to filter benzene, toluene and xylenes (BTX) and particulates in the treated flash gas.

Some aspects combinable with any of the other aspects described in this disclosure can include the following features. To flow the treated flash gas through the filtering column, the treated flash gas is flowed through activated charcoal and a mechanical filter in the filtering column.

Certain implementations of the subject matter described here can be implemented as a system for treating natural gas. The system includes a column section configured to receive flash gas comprising residual acid gas from a flash drum coupled to the column section. The system includes a pump fluidically coupled to the column section. The pump is configured to flow a lean amine stream at a flow rate to the column section. The lean amine stream is configured to treat the residual acid gas. The system includes a controller connected to the pump. The controller is configured to operate the pump to periodically vary the flow rate of the lean amine stream based, in part, on a rate at which the flash gas flowed from the flash drum through the column section and a concentration of the residual acid gas or sour gas in the flash gas.

Some aspects combinable with any of the other aspects described in this disclosure can include the following features. The system includes a flash gas flow meter configured to measure the rate at which the flash gas is flowed from the flash drum through the column section. The flash gas flow meter is coupled to the controller and is configured to transmit the measured rate at which the flash gas is flowed from the flash drum through the column section to the controller.

Some aspects combinable with any of the other aspects described in this disclosure can include the following features. The system includes a flash gas analyzer configured to measure the concentration of the residual acid or sour gas in the flash gas. The flash gas analyzer is coupled to the controller and configured to transmit the measured concentration of the residual acid or sour gas in the flash gas to the controller.

Some aspects combinable with any of the other aspects described in this disclosure can include the following features. The system includes a filtering column configured to receive treated flash gas exiting the column section, the filtering column configured to filter benzene, toluene and xylenes (BTX) and particulates in the treated flash gas.

Some aspects combinable with any of the other aspects described in this disclosure can include the following features. The filtering column includes an activated charcoal bed to filter the BTX and a mechanical filter to filter the particulates.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A typical amine gas treating process includes an absorber unit and a regenerator unit as well as accessory equipment. In the absorber, a downflowing amine solution absorbs $H_2S$ and $CO_2$ from an upflowing sour gas or acid gas to produce a sweetened gas stream, that is, a gas stream free of or carrying comparatively reduced concentrations of $H_2S$ and $CO_2$, as a product and an amine solution rich in the absorbed acid gas. In some treating processes, the rich amine solution is routed to a flash drum in which the solution resides for a duration sufficient for the amine solution to settle and the acid gas to rise. Natural gas (for example, light hydrocarbons) carried with the amine solution rise to the top of the flash drum and are flashed off.

Sometimes, some acid gas rises with the flash gas. To further sweeten the flash gas, a column section is attached to the flash drum. A full stream of lean amine is flowed downward through the column section as the flash gas including the acid gases rises through the column section. The lean amine further sweetens the flash gas resulting in treated flash gas. This disclosure describes techniques to automatically (that is, without user intervention) control the lean amine stream flowed through the column section to improve sweetening efficiency in the column section. This disclosure also describes techniques to further treat the treated flash gas with an activated charcoal bed to remove benzene, toluene and xylene (BTX) as well as a mechanical filter to filter particulates. In some implementations, the further treatment is implemented in a filtering column through which the treated flash gas is flowed.

Figure 1:
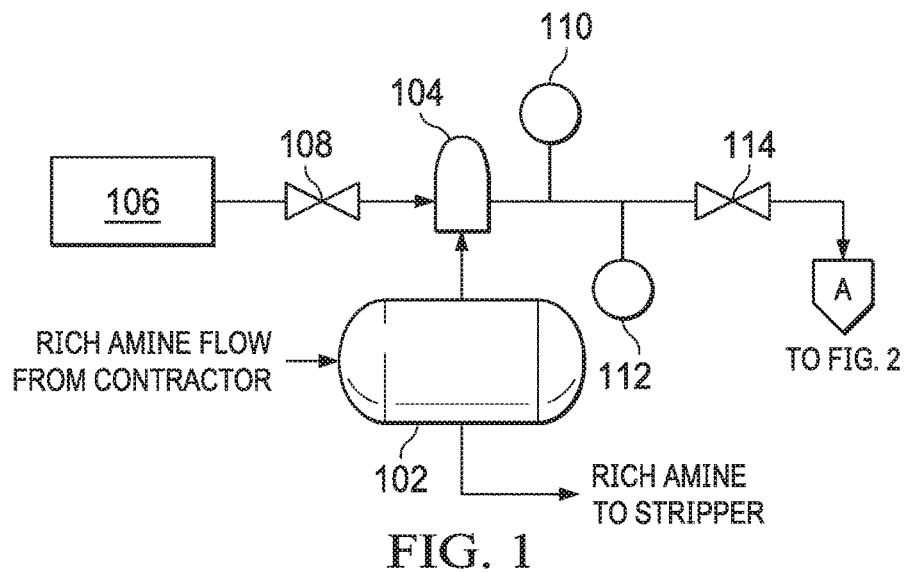
FIG. 1 is a schematic diagram of a flash drum connected to a column section for treating natural gas.

FIG. 1 is a schematic diagram of a flash drum 102 connected to a column section 104 for treating natural gas. The flash drum 102 receives an amine stream rich in acid gas from an absorber or contactor (not shown) in which the acid gas is initially treated, that is, sweetened. The amine rich stream carries some dissolved natural gas which is flashed off. As described earlier, some acid gas in the rich amine stream is flashed off with the dissolved natural gas.

The flash drum 102 is connected to a column section 104 through which the flash gas is flowed. A lean amine stream is flowed through the column section 104 to sweeten the rising flash gas including the acid gas. In some implementations, the lean amine stream is flowed from a source, for example, a tank (not shown), using a pump (not shown). The column section 104 is connected to a controller 106 that is also connected to the tank or the pump (or both) to control fluid parameters of the lean amine stream flowed to the column section 104.

In some implementations, the controller 106 is implemented as a computer system including one or more processors and a computer-readable medium storing instructions executable by the one or more processors to perform operations described here. In some implementations, the controller 106 is implemented as processing circuitry including electrical or electronic components configured to perform operations described here.

In some implementations, the controller 106 can control fluid parameters such as a quantity of the lean amine stream or a volumetric flow rate of the lean amine stream flowed to column section 104. For example, one or more valves (for example, valve 108) can be coupled between the pump that flows the lean amine stream and the column section 104. The controller 106 can be coupled to the valve 108 to open or close, either fully or partially, the valve 108 in addition to controlling the pump to flow the lean amine stream from the tank to the column section 104.

In some implementations, the controller 106 can store instructions to determine the quantity of the lean amine stream to be flowed through the column section 104 using the following equation.

$$\text{Set point of lean amine} = \frac{\text{Flash gas rate} \times \text{Acid gas concentration} \times \text{Amine mole factor}}{\text{Lean amine acid loading} \times \text{Lean amine concentration}}$$

Set point of lean amine is the flow rate of the lean amine stream. Flash gas rate is the rate at which the flash gas including the acid gas is flowed out of the flash drum 102 and into the column section 104. Amine mole factor is a constant selected based on a type of the lean amine stream. Lean amine acid loading is an amount of acid gas separated by the lean amine stream. Lean amine concentration is an amount of amine in the lean amine stream.

The controller 106 operates the pump and other components to flow the lean amine stream at the determined set point of lean amine. To determine the set point of lean amine, the controller 106 receives, as input, the flash gas rate, for example, in MMSCFD. A flow meter 110 is connected to the outlet stream of the column section 104, for example, before the outlet stream goes to sales gas stream or hydrocarbon thermal oxidizer unit, to measure the flash gas rate. The flow meter 110 periodically measures the flash gas rate and provides the measured rate as input to the controller 106, for example, at a frequency of once per second or at a lesser or greater frequency.

Acid gas concentration, measured, for example, in percentage weight, is the concentration of acid gas in the flash gas exiting the flash drum 102 and entering into the bottom of the column section 104. An online gas analyzer 112 is connected to the flash gas leaving the column section 104, for example, at the outlet at which the flash gas leaves the column section 104, to measure the acid gas concentration. The online gas analyzer 112 periodically measures the acid gas concentration and provides the measured acid gas concentration to the controller 106, for example, at a frequency of once per second or at a lesser or greater frequency. In some implementations, the analyzer 112 is an ultra-violet (UV) photometer that can measure any single UV-absorbing gas species. Alternatively or in addition, the analyzer 112 can be implemented as a thermal conductivity sensor that can detect non-UV absorbing species such as $CO_2$ and $H_2S$. In some implementations, the analyzer 112 can use industrial electronics to provide concentration calculations, data processing, temperature control, calibration and sophisticated self-diagnostics.

Amine mole factor varies for different types of amines. For example, the lean amine stream can be one of methyl diethanolamine (MDEA) with a mole factor of 119 kilograms per mole (kg/mol), diethanolamine (DEA) with a mole factor of 105 kg/mol, diglycolamine (DGA) with a mole factor of 105 kg/mol or monoethanolamine (MEA) with a mole factor of 62 kg/mol. For a given type of amine, the mole factor remains constant. The type of amine chosen for the lean amine stream can be the same for the entire sweetening process or can be changed during the sweetening process. Depending on the lean amine chosen, the amine mole factor is a constant and is provided as input to the controller 106.

Lean amine acid loading is the amount of sour gas or acid gas, on a molar basis, that will be picked up by a solvent and is expressed in units of mole of acid gas per mole of amine. The lean amine acid loading for MDEA, DEA, DGA and MEA is 0.4 mole of acid per mole of MDEA, 0.5-0.7 mole of acid per mole of DEA, 0.5 mole of acid per mole of DGA and 0.35 mole of acid per mole of MEA, respectively. Depending on the lean amine chosen, the lean amine acid loading is a constant and is provided as input to the controller 106.

Lean amine concentration is the amount of amine in the absorbent aqueous liquid solution. The lean amine concentration for MDEA, DEA, DGA and MEA is about 40% to 50% for removing $H_2S$ and $CO_2$, about 20% to 25% for removing $H_2S$ and $CO_2$, about 30% to 50% for removing $H_2S$ and $CO_2$ and about 20% for removing $H_2S$ and $CO_2$, respectively. The lean amine concentration of MEA for removing only $CO_2$ is about 32%. Depending on the lean amine chosen, the lean amine concentration is a constant and is provided as input to the controller 106.

While the amine mole factor, the lean amine acid and the lean amine concentration are constant for a chosen lean amine stream, the flash gas rate and the acid gas concentration are variable over time. In operation, the controller 106 receives the amine mole factor, the lean amine acid and the lean amine concentration as input, for example, from a natural gas processing plant operator. The controller 106 is connected to the flow meter 110 and the online gas analyzer 112 from which the controller 106 periodically receives, as input, the flash gas rate and the acid gas concentration, respectively. The controller 106 determines the set point of lean amine, for example, in gallons per minute, using the five inputs and the equation presented earlier. The controller 106 operates the pump or the valve 114 or both to modify the flow rate of the lean amine stream at the determined set point of lean amine.

In some implementations, the controller 106 determines the set point of lean amine and controls the flow parameters of the lean amine stream in real-time. By real-time, it is meant that time between the controller 106 receiving the measurements from the flow meter 110 and the online gas analyzer 112, and the controller 106 determining the set point of lean amine and operating the pump or the valve 114 or both to modify the flow rate of the lean amine stream is negligible, for example, of the order of milliseconds or microseconds or nanoseconds. By periodically measuring the flash gas rate and the acid gas concentration and using the measured values as inputs in a feedback loop, the controller 106 can control the quantity of lean amine stream flowed through the column section 104. Such control can increase the efficiency of the sweetening process while optimizing the quantity of the lean amine stream used.

Figure 2:
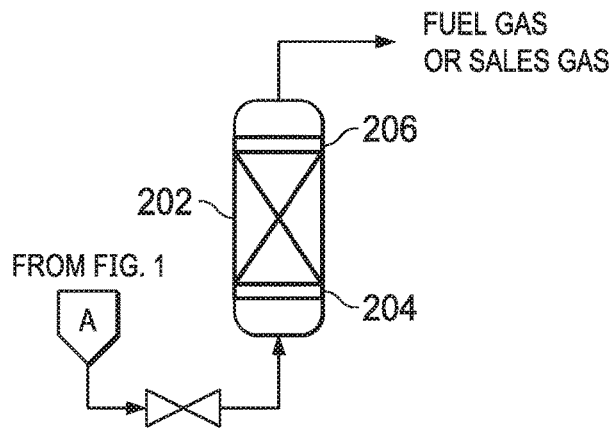
FIG. 2 is a schematic diagram of a filtering column connected to the column section for treating natural gas.

FIG. 2 is a schematic diagram of a filtering column 202 connected to the column section 102 for treating natural gas. The sweetened gas that exits the column section 102 (called treated flash gas) is flowed through a filtering column 202 that captures BTX and filters particulates in the treated flash gas. In some implementations, the filtering column 202 includes a bottom inert ceramic portion 204 and a top inert ceramic portion 206, each of which can include the filtration material. For example, the bottom inert ceramic portion 204 can include activated charcoal and the top inert ceramic portion 206 can include ceramic spherical balls of a size sufficient to provide a surface area to capture the particulates in the treated flash gas. Before processing flash gas to either sales gas stream or hydrocarbon thermal oxidizer as fuel gas energy source, the gas can go through a three-step filtration system including, for example, the filtering column 202.

The filtration system can include gas/liquid coalesce filter (pre-filter), an activated carbon filter and a mechanical filter. Gas/liquid coalesce filter is made of coalescing elements, which is capable of removing long-chain hydrocarbon carryover in the inlet of the hydrocarbon thermal oxidizer or even sales gas stream. Activated carbon filter is grand bed (downstream of the gas/liquid coalesce filter) that removes chemical contaminants. Such a filtration system can be designed for full flow of flash gas. The mechanical filters, for example, polyprobaline cartridge filters or pre-coat filters, remove a particulate material, for example, charcoal particles, and are designed to remove all particles above 1 micrometer (μm) in size. The gas that exits the filtering column 202 is sweetened fuel gas or sales gas.

Figure 3:
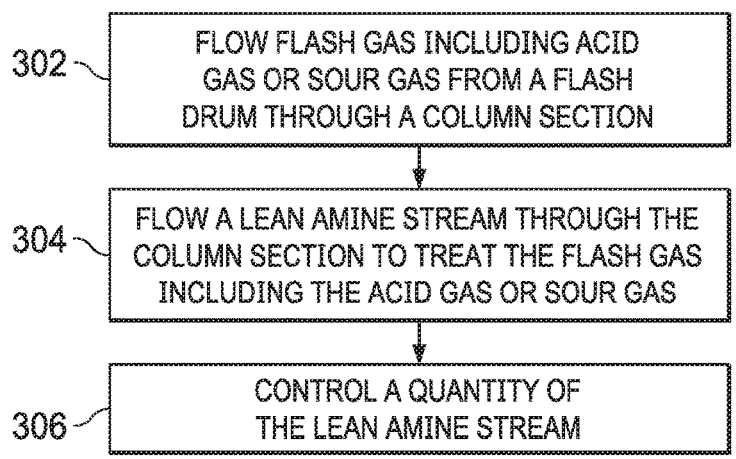
FIG. 3 is a flowchart of an example of a process for controlling a flow rate of an amine stream through the column section.

FIG. 3 is a flowchart of an example of a process 300 for controlling a flow rate of an amine stream through the column section. At 302, flash gas including acid gas or sour gas is flowed from a flash drum, for example, the flash drum 102, through a column section, for example, the column section 104. At 304, a lean amine stream is flowed through the column section, for example, the column section 104, to treat the flash gas including the acid gas or the sour gas.

At 306, a quantity of the lean amine stream is controlled, for example, by the controller 106 as described earlier. For example, an initial quantity of the lean amine stream can be input into the controller 106. The controller 106 can receive periodic measurements of the rate at which the flash gas is flowed and the concentration of the acid gas or sour gas, for example, from the flow meter 110 and the online gas analyzer 112, respectively. The controller 106 can periodically update the initial quantity to determine a revised quantity of the lean amine stream based on the periodic measurements. The controller can then vary a flow rate of the lean amine stream through the column section 104 according to the revised quantity. In some implementations, the controller 106 can vary the flow rate between 0.05 MMSCFD and 2.0 MMSCFD.

Thus, particular implementations of the subject matter have been described. Other implementations are within the scope of the following claims.

The invention claimed is:

1. A method comprising:
   flowing flash gas comprising acid gas from a flash drum through a column section connected to the flash drum;
   flowing a lean amine stream through the column section, the lean amine stream configured to treat the acid gas flowed from the flash drum through the column section; and
   controlling a quantity of the lean amine stream flowed through the column section based, in part, on a rate at which the flash gas comprising the acid gas is flowed from the flash drum through the column section and a concentration of the acid gas in the flash gas comprising the acid gas.

2. The method of claim 1, wherein controlling the quantity of the lean amine stream comprises:
   determining an initial quantity of the lean amine stream;
   receiving periodic measurements of the rate at which the flash gas comprising the acid gas is flowed and the concentration of the acid gas; and
   periodically updating the initial quantity to determine a revised quantity of the lean amine stream based on the periodic measurements.

3. The method of claim 2, wherein controlling the quantity of the lean amine stream comprises periodically varying a flow rate of the lean amine stream through the column section according to the revised quantity of the lean amine stream.

4. The method of claim 3, wherein the flow rate is varied between 0.05 million standard cubic feet per day (MMSCFD) and 2.0 MMSCFD.

5. The method of claim 2, wherein the initial quantity is periodically updated according to the following equation:

$$\text{Set point of lean amine} = \frac{\text{Flash gas rate} \times \text{Acid gas concentration} \times \text{Amine mole factor}}{\text{Lean amine acid loading} \times \text{Lean amine concentration}},$$

wherein Set point of lean amine is the flow rate of the lean amine stream, Flash gas rate is the rate at which the flash gas comprising the acid gas are flowed, Amine mole factor is a constant selected based on a type of the lean amine stream, Lean amine acid loading is an amount of acid gas separated by the lean amine stream, and Lean amine concentration is an amount of amine in the lean amine stream.

6. The method of claim 1, further comprising:
   flowing treated flash gas exiting the column section through a filtering column configured to filter benzene, toluene and xylenes (BTX) and particulates in the treated flash gas.

7. The method of claim 6, wherein flowing the treated flash gas through the filtering column comprises flowing the treated flash gas through activated charcoal and a mechanical filter in the filtering column.

8. A method comprising:
   flowing flash gas comprising residual acid gas from a flash drum through a column section connected to the flash drum, wherein the residual acid gas rises with flash gas from the flash drum, wherein the flash gas is carried with an amine solution resulting from treating sour gas with the amine solution;
   in the column section, contacting the flash gas with a lean amine stream configured to treat the residual acid gas, the lean amine stream flowed through the column section at a flow rate; and periodically varying the flow rate of the lean amine stream based, in part, on a rate at which the flash gas is flowed from the flash drum through the column section and a concentration of the residual acid gas in the flash gas.

9. The method of claim 8, further comprising:

periodically receiving the rate at which the flash gas is flowed from the flash drum through the column section; and periodically receiving the concentration of the residual acid in the flash gas.

10. The method of claim 9, further comprising:

periodically measuring the rate at which the flash gas is flowed from the flash drum through the column section; and periodically measuring the concentration of the residual acid in the flash gas.

11. The method of claim 8, wherein the flow rate of the lean amine stream is varied in real-time.

12. The method of claim 8, wherein the flow rate of the lean amine stream is periodically varied according to the following equation:

$$\text{Set point of lean amine} = \frac{\text{Flash gas rate} \times \text{Acid gas concentration} \times \text{Amine mole factor}}{\text{Lean amine acid loading} \times \text{Lean amine concentration}},$$

wherein Set point of lean amine is the flow rate of the lean amine stream, Flash gas rate is the rate at which the flash gas comprising the acid gas are flowed, Amine mole factor is a constant selected based on a type of the lean amine stream, Lean amine acid loading is an amount of acid gas separated by the lean amine stream, and Lean amine concentration is an amount of amine in the lean amine stream.

13. The method of claim 8, further comprising:

flowing treated flash gas exiting the column section through a filtering column configured to filter benzene, toluene and xylenes (BTX) and particulates in the treated flash gas.

14. The method of claim 13, wherein flowing the treated flash gas through the filtering column comprises flowing the treated flash gas through activated charcoal and a mechanical filter in the filtering column.

* * * * *